United States Patent [19]
Castelaz

[11] Patent Number: 5,511,218
[45] Date of Patent: Apr. 23, 1996

[54] CONNECTIONIST ARCHITECTURE FOR WEAPONS ASSIGNMENT

[75] Inventor: Patrick F. Castelaz, Yorba Linda, Calif.

[73] Assignee: Hughes Aircraft Company, Los Angeles, Calif.

[21] Appl. No.: 220,413

[22] Filed: Mar. 30, 1994

Related U.S. Application Data

[63] Continuation of Ser. No. 660,363, Feb. 13, 1991, abandoned.

[51] Int. Cl.$^6$ .............. G06F 12/02; G06F 15/50; F41G 9/02

[52] U.S. Cl. .......... 395/800; 395/650; 395/500; 364/232.3; 364/229.5; 364/230.3; 364/256.8; 364/264.3; 364/267.2; 364/275.2; 364/281.6; 364/423; 364/DIG. 1; 364/DIG. 2; 89/1.11

[58] Field of Search .............. 395/650, 600, 395/725, 800, 575, 500, 200; 364/423, 424.01, 424.02, 424.03, 424.07, 554, DIG. 1, DIG. 2; 89/1.11; 342/62, 63, 64, 65, 173, 169, 451

[56] References Cited

U.S. PATENT DOCUMENTS

| 4,093,236 | 6/1978 | Hoffa | 273/255 |
|---|---|---|---|
| 4,210,961 | 7/1980 | Whitlow et al. | 395/600 |
| 4,267,562 | 5/1981 | Raimondi | 89/1.11 |
| 4,744,028 | 5/1988 | Karmarkar | 364/402 |
| 4,782,444 | 11/1988 | Munshi et al. | 395/700 |
| 4,797,839 | 1/1989 | Powell | 364/423 |
| 4,848,208 | 7/1989 | Kosman | 89/1.11 |
| 4,885,686 | 12/1989 | Vanderbei | 364/402 |
| 4,914,563 | 4/1990 | Karmarkar et al. | 364/148 |
| 4,924,386 | 5/1990 | Freedman et al. | 364/402 |
| 4,953,084 | 8/1990 | Meloy et al. | 395/575 |
| 5,036,466 | 7/1991 | Fitzgerald et al. | 364/423 |
| 5,070,453 | 12/1991 | Duffany | 364/402 |
| 5,077,661 | 12/1991 | Jain et al. | 364/402 |
| 5,115,391 | 5/1992 | Puthenpura et al. | 364/152 |
| 5,136,538 | 8/1992 | Karmarkar et al. | 364/754 |
| 5,148,365 | 9/1992 | Dembo | 364/402 |
| 5,153,366 | 10/1992 | Lucas | 89/1.11 |

Primary Examiner—Daniel Pan
Attorney, Agent, or Firm—W. K. Denson-Low

[57] ABSTRACT

A system (20) for producing an assignment of a plurality of entities (12) to a plurality of objects (16). This assignment is optimized subject to fixed constraints. The system (20) represents the assignment as a connectionist processing architecture having multiple processing elements (22), (24). These processing elements (22), (24) include a first class of processing elements (22) each representing groups of the entities (12) and a second class of processing elements (24) representing the objects (16). Also a plurality of interconnections (26) between the first and second classes of processing elements (22), (24) having variable weighted connection strengths which are a function of the constraints and also a function a random noise factor. The system (20) also includes a means for selectively assigning the entities (28) one-by-one to the object based on the strength of the interconnections (26).

15 Claims, 5 Drawing Sheets

28

DEFINITIONS

A(i,j) = Connection "strength" between FU(i) and ASSET(j)
C(i,j) = Coverage of FU(i) over ASSET(j) [Boolean = 0 or 1]
M(i) = Number of missiles initially available to FU(i)
V(j) = Value ("priority") of ASSET(j)
T(j) = Threat-count against ASSET(j)
RND = Uniform pseudo-random number [Continuous, 0-1]

1) Initialize all FIRE-UNIT/ASSET interconnects: A(i,j) = RND×M(i)×C(i,j)

2) Scale all interconnect by value of ASSET: A(i,j)×V(j)

3) Find maximum interconnect: A(max) = MAX[A(i,j)] (call interconnect imax, jmax)

4) Assign 1 missile from FIRE-UNIT(imax) to defend ASSET(jmax)

5) If all missile are used from FIRE-UNIT(imax) then set all A(imax,j) =0
 . If all theats against ASSET(jmax) are defeated then set all A(i,jmax) =0
6) If all missiles are depleted, all threat defeated, or no new assigns made — DONE 7) If A(max)<TH then GOTO (1); else GOTO (4) . {TH= (# FIRE-UNITS)× (#ASSETS)}

Fig-3

| RESULTS INDICATE PREFERENTIAL COVERAGE OF HIGH-VALUED ASSETS, AS EXPECTED. ||||||
|---|---|---|---|---|---|
| # ASSETS | FIRE-UNIT COVERAGE | # THREATS | TOTAL DAMAGE | DAMAGE (HIGH/MED/LOW) | # OF RUNS |
| 11 | 0.3 | 154 | 0.19 | 0.0/0.28/0.50 | 1 |
| 12 | 0.3 | 261 | 0.28 | 0.0/0.43/0.55 | 1 |
| 7 | 0.7 | 144 | 0.0 | 0.0/0.0/0.0 | 1 |
| 10 | 0.7 | 272 | 0.25 | 0.0/0.37/1.0 | 1 |
| 30 | 0.3 | 144 | 0.26 | 0.16/0.33/0.17 | 1 |
| 31 | 0.3 | 252 | 0.36 | 0.43/0.28/0.67 | 1 |
| 29 | 0.7 | 146 | 0.03 | 0.0/0.06/0.0 | 1 |
| 31 | 0.7 | 255 | 0.22 | 0.0/0.33/1.0 | 1 |
| 30 | 0.7 | 250 | 0.20 | 0.0/0.43/1.0 | 5 |
| 30 | 0.7 | 200 | 0.02 | 0.0/0.0/0.02 | 5 |
| 50 | 0.85 | 741 | 0.002 | 0.0/0.0/0.04 | 1 |

OF FIRE-UNITS: 3 . AVERAGE # MISSILES PER FIRE-UNIT: 60

Fig-5

CONNECTIONIST ARCHITECTURE FOR WEAPONS ASSIGNMENT

This is a continuation of application Ser. No. 07/660,363, filed Feb. 13, 1991, now abandoned.

BACKGROUND OF THE INVENTION

1. Technical Field

This invention relates to processors and methods for solving assignment problems and, in particular, to processors and methods for solving large constrained assignment problems in real time.

2. Discussion

The solution of large scale assignment problems is a major challenge to conventional data processing 10 systems. Generally, in assignment problems a number of elements are to be selected from among many others and assigned to other elements in such a way as to force to the entire assignment over all the elements to be optimal in some sense. Part of the difficulty of association problems is that they are generally not solvable with a single solution but, instead, there may be a range of solutions over which the best solution is sought. Moreover, association problems frequently involve a combinatorial "explosion" or exponential blow up, in the number of possible answers. Association problems are found in a number of applications, including among others, resource allocation, object association, data fusion, pattern matching, and manufacturing inspection systems.

Most of the current approaches to solving these problems have a number of drawbacks. These often involve difficulties in developing algorithms and software. Also, an inordinate amount of CPU time is usually required once the algorithms and software have been developed. One example is in the area of resource allocation. This field involves the efficient optimization of the allocation of technological or industrial resources. One commonly used technique for resource allocation is called linear programming. A linear programming model consists of a number of linear expressions that represent the quantitative relationships between the various possible allocations, their constraints, and their costs or their benefits. The set of relationships is said to be linear if all of the relationships are sums of constant coefficients multiplied by unknown allocation values which are equal to, greater than or equal to, or less than or equal to, a constant. Unfortunately, many resource allocation problems cannot be represented by such linear relationships but involve higher powers of unknowns or non-linearities in the relationships and thus are not solvable using linear programming approaches.

For allocations problems which do fit the linear programming model, the most commonly used approach is called the Simplex method, developed by G. B. Dantzig in 1946. More recently, the barrier, interior point (Karmarkar) method improved upon the simplex method. See U.S. Pat. No. 4,744,028 issued to Karmarkar. However, even improved linear programming techniques still require an inordinate amount of processing time for large scale problems thus precluding their use in real time applications. In this context, real time is defined as providing an optimum allocation sufficiently fast to provide more or less continuous control of an ongoing process, system for apparatus. Further, linear programming techniques still require extensive front end analysis which must be redone for each new nuance in the assignment problem structure. Also, these approaches exhibit a high sensitivity to input data scaling.

In view of the forgoing, it would be desirable to have a system which can solve large constrained assignment problems in real time. Further, it would be desirable to have such a system which can achieve well-balanced near optimal assignments at high speeds. Also, it would be desirable to have an assignment processor which requires minimal algorithm development, minimal software development, and minimal preprocessing.

In addition, it would be desirable to have such a system which is tolerant of coarsely normalized input data and which is also able to adapt quickly to small changes in the assignment problem structure. Finally, it would be desirable to have an assignment processor which can be constructed at low cost utilizing low complexity hardware components.

SUMMARY OF THE INVENTION

In accordance with one aspect of the present invention, a system is provided for producing an assignment of a plurality of entities to a plurality of objects. The assignment is optimized subject to fixed constraints. This system represents the assignment as a connectionist processing architecture having multiple processing elements. These processing elements include a first class of processing elements, each representing groups of the entities and a second class of processing elements representing the objects. Also, a plurality of interconnections between the first and second classes of processing elements have variable weighted connection strengths which are a function of the constraints and also a function of a random noise factor. The system also includes a means for selectively assigning the entities one-by-one to the objects based on the strength of the interconnections. In accordance with a preferred embodiment, the assignment is made from the first class of processing elements having the strongest connection to the second of class of processing elements.

In accordance with another aspect of the present invention, a method is provided for solving assignment problems. In particular, the method assigns a plurality of entities to a plurality of objects subject to fixed constraints. The method includes representing the assignment as a connectionist processing architecture having multiple processing elements wherein a first class of processing elements each represents groups of the entities, and a second class of processing elements represents the objects. Next, the method involves the step of providing a plurality of interconnections between the first and second classes of processing elements where the interconnections have variable weighted strengths which are a function of the constraints and also a function of a random noise factor. Finally, the entities are selectively assigned one-by-one to the objects based on the strength of the interconnections.

BRIEF DESCRIPTION OF THE DRAWINGS

The various advantages of the present invention will become apparent to those skilled in the art after reading the following specification and by reference to the drawings in which:

FIG. 3 is a detailed flow chart of the steps performed in FIG. 2;

FIG 5 is an example of experimental results based on the experimental simulation of FIG. 4.

DESCRIPTION OF THE PREFERRED EMBODIMENTS

In accordance with the teachings of the present invention, a system and method is provided for solving large constrained assignment problems in real time. This system and method will be explained through the example of a system adapted for weapons assignment. It will be appreciated that this preferred embodiment is but one example of an assignment to which the system and method of the present invention can be employed.

Figure 1:
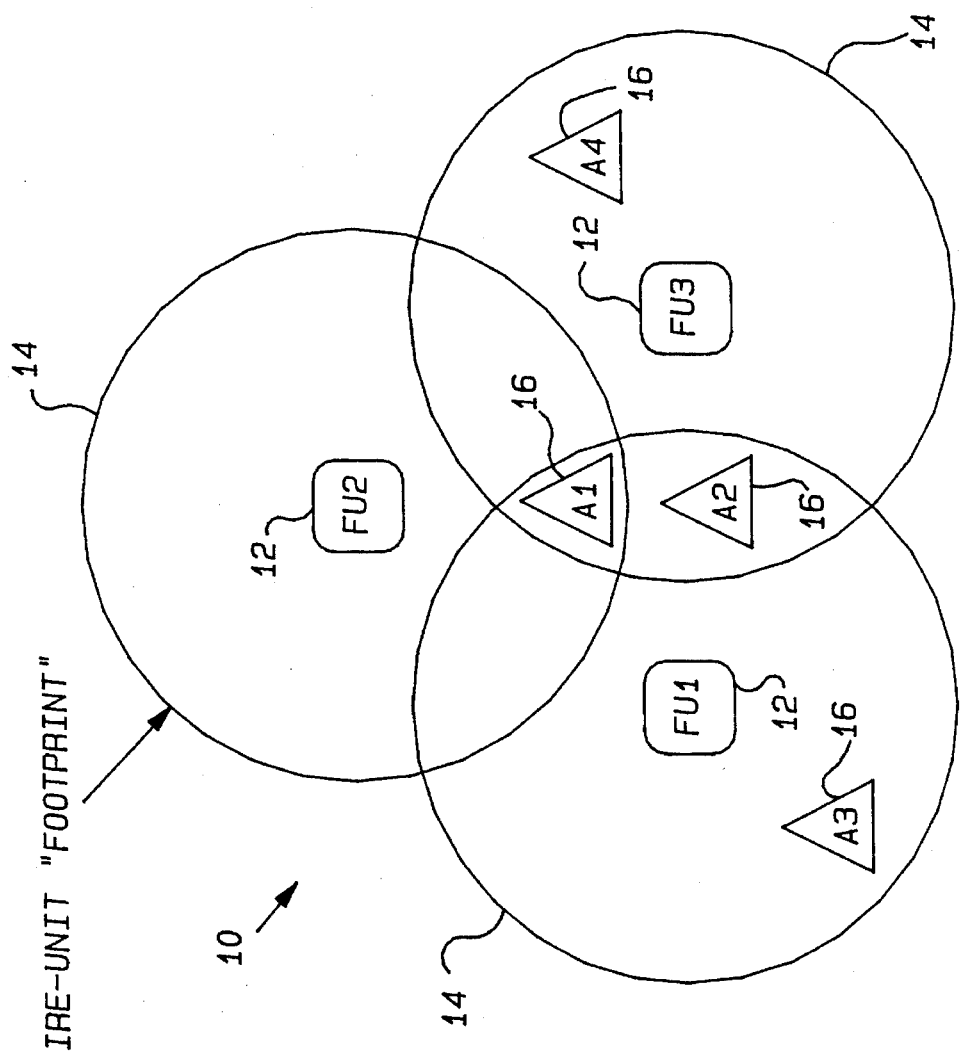
FIG. 1 is a diagram of a weapons allocation assignment problem to be solved in accordance with a preferred embodiment of the present invention.

Referring now to FIG. 1, a diagram of the weapons assignment problem is shown. In particular, the weapons assignment problem 10 involves assigning fire-units to cover assets so as to minimize total damage from a given size threat. The fire units 12 have different strengths depending on the number of missiles they contain. They also have a coverage area or footprint 14 which defines the area of coverage of the fire unit's missiles. Assets 16 having different values or priorities, are shown as triangular areas. The fire unit footprints 14 overlap one another. For example, asset A1 could be covered by fire unit 1, 2, or 3 since it lies within the footprint 14 of all three fire units.

Each asset 16 will have a given number of threats (not shown) assigned to it. In a realistic scenario, there may be, for example, hundreds of threats assigned to each asset. It will be assumed that one missile is required to defeat each threat. Also, in a realistic scenario, there may be dozens of assets having threats assigned to them totaling in the hundreds. Each fire unit 12 may have, for example, approximately 60 missiles. The large number of threats, missiles, and assets make the assignment problem very computationally intensive for conventional processing systems. Further, in a realistic situation, the scenario may change within minutes. Thus, the assignment must be completely redone within this time frame to address the new scenario.

Figure 2A:
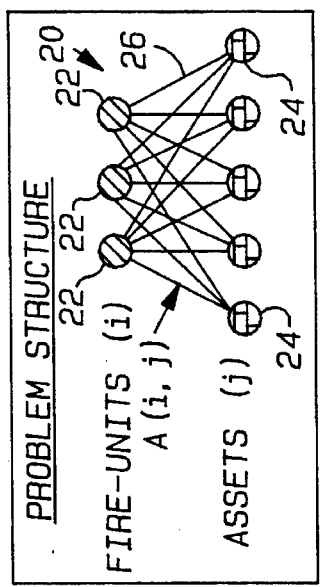
FIG. 2A is a diagram of a connectionist architecture for solving the assignment problem shown in FIG. 1 in accordance with the present invention.

FIG. 2A is a diagram of the concept of the connectionist architecture for weapons assignment (CWA) 20. Input processing elements 22 are depicted as representing the fire units 12. Output processing elements 24 are shown representing the assets 16. Connective lines 26 between the input processing elements 22 and output processing elements 24 are depicted which provide connections between each input processing element 22 and each output processing element 24. The particular fire unit (FU) represented by each processing element 22 is designated by the subscript (i) while the asset 15 represented by the processing element 24 is represented by subscript (j). Each connective line 26 is represented as A (i,j) where i and j designate the processing elements connected by the particular connective line 26.

Figure 2B:
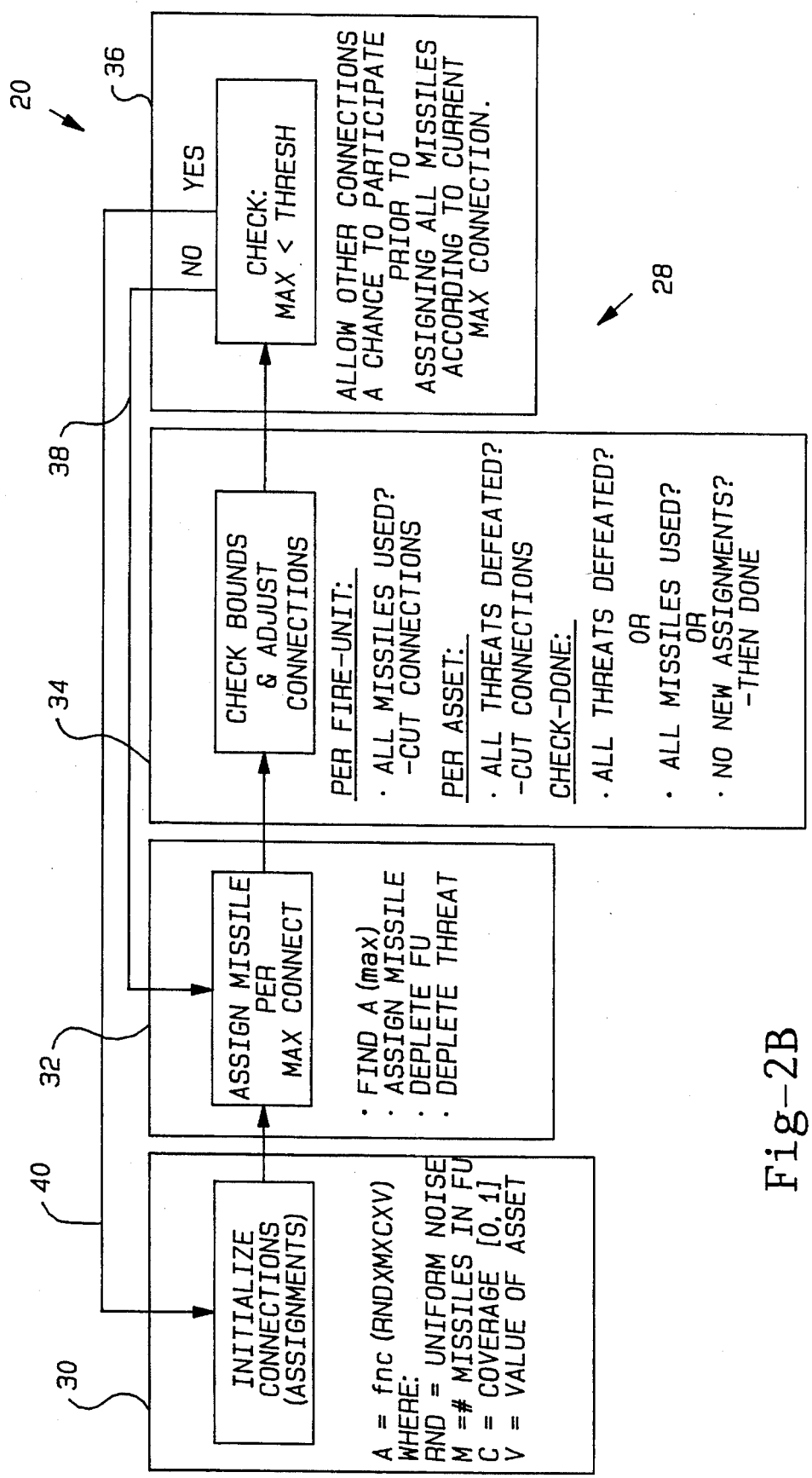
FIG. 2B is a flow chart of the assignment processing steps in accordance with the present invention.

Referring now to FIG. 2B, a flow chart 28 for the connectionist architecture for weapons assignment (CWA) system 20 in accordance with the present invention is shown. The first block 30 in the flow chart 28 is labeled "initialize connections (assignments)". In this step, the connections shown as lines 26 in FIG. 2A are initialized to be A. Connections A are a function of RND (a random number)×M×C×V where: A(ij) is the connection "strength" between fire-unit (i) and asset (j). The random number may be a uniform pseudo-random number which is a continuously variable value between 0 and 1. M is the number of missiles in FU(i), C is the coverage of FU(i). The coverage C may be a between 0 or 1, where a 0 indicates that the asset j is outside of the coverage of the fire unit i, and a 1 indicates that asset j is within the coverage of fire unit i. V is equal to the value of asset j. Value may be derived from a number of considerations, one of which may be the actual economic value of the asset. In any event, V will serve to prioritize assets.

Step 32 is labeled "assigned missile per max connect". In this step, the connection A(i,j) 26 which has the largest value is determined and missiles are assigned from the fire unit to the asset until the missiles and the fire unit or the threat are depleted. Step 34 looks at the fire units to determine if all the missiles have been used. This step also checks each asset 10 to determine if all threats against the asset are defeated. Once all missiles are used, the max connection is cut to permit the CWA 20 to proceed to different FU's by finding a new max connect in step 32. Likewise, once all threats are defeated for an asset, connections to that 15 asset are cut to permit the CWA processor 20 to proceed to assign missiles to different assets by finding a new max connect in step 32. When all the threats have been defeated, or all the missiles have been used, or there are no new assignments, then this step determines that the processing is complete.

Step 36 checks the value of the max A(i,j) to determine if it is less than a predetermined threshold. If it is not, then step 36 permits the processing to continue along line 38 back to block 32 to permit other missiles to be assigned. If block 36 determines that the max A(i,j) is less than the threshold, then it directs the process along line 40 back to block 30 to initialize connections for remaining missile assignments to be made. This reinitialization, due to the random number factor, will allow other connections a chance to participate prior to assigning all the missiles according to the current maximum connection.

Referring now to FIG. 3 further details of the processing flow 28 of the CWA 20 are shown. In a preferred embodiment of the present invention, the process 28 is broken down into seven main steps. In step 1, the fire unit and asset interconnects A(i,j) are initialized according to the equation:

$$A(i,j) = FNC[rnd \times M(i) \times C(i,j)].$$

The nature of this function "FNC" is not critical and may be for example, a simple linear function. In this step, each interconnect is initialized as a function of coverage C and missiles M available. This uniformly and randomly distributes potential assignment of missiles across assets covered by each fire unit. This assignment is biased by the number of missiles available at each fire unit. In step 2, all interconnects are scaled by the value of the asset by the multiplication:

$$A(i,j) \times V(j)$$

In this way, for example, high value assets increase the interconnect strength giving them the desired priority.

In step 3, the maximum interconnect is determined. This interconnect is referred to as imax, jmax. This maximum corresponds to the best assignment as a function of the missiles available, coverage, and value of asset. In step 4, the CWA system 20 assigns one missile from fire unit (imax) to defend asset (jmax). Also, the fire unit (imax) is depleted by one, the threat count T(jmax) is depleted by one where, T (j) is the maximum number of missiles allowed in the defense asset (j). P (k)=1, where P (k) is "probability of kill", corresponding to the probability that the missile defeats the threat. The present invention may be extended to cover the case where P(k) may be <1, also.

In step 5, the process 28 determines if all missiles are used from fire unit (imax). If so, then all A(imax,j) are set to 0. This eliminates fire unit (imax) from future processing. In addition, step 5 determines if all threats against asset (jmax) are defeated. If so, then all A (i,jmax) are set to zero. This effectively eliminates asset (jmax) from future processing.

Step 6 determines whether the processing is completed by determining if all the missiles are depleted, or all threats are defeated, or there are no new assignments. If so, then process 28 is complete and the assignment may be output to a postprocessing step which may be performed by a host computer (not shown). If the process is not completed, step 7 determines if A(max) is less than a predetermined threshold. If so, then the process proceeds to step 1 so that all of the remaining fire unit and asset interconnects are reinitialized. If A(max) is not less than a threshold, then the process returns to step 4 and additional missiles from fire unit (imax) will be assigned. This check against the threshold allows other fire units a chance to participate to the solution prior to deploying all the missiles from the current fire unit. In accordance with a preferred embodiment, a threshold may be set a priori or adaptively to an arbitrary small value less than or equal to the largest possible A(max) value. For example, multiplying the number of fire units by the number of assets would yield a threshold within the range 0+ A(Max), but typically much smaller than the largest A(max).

Figure 4:
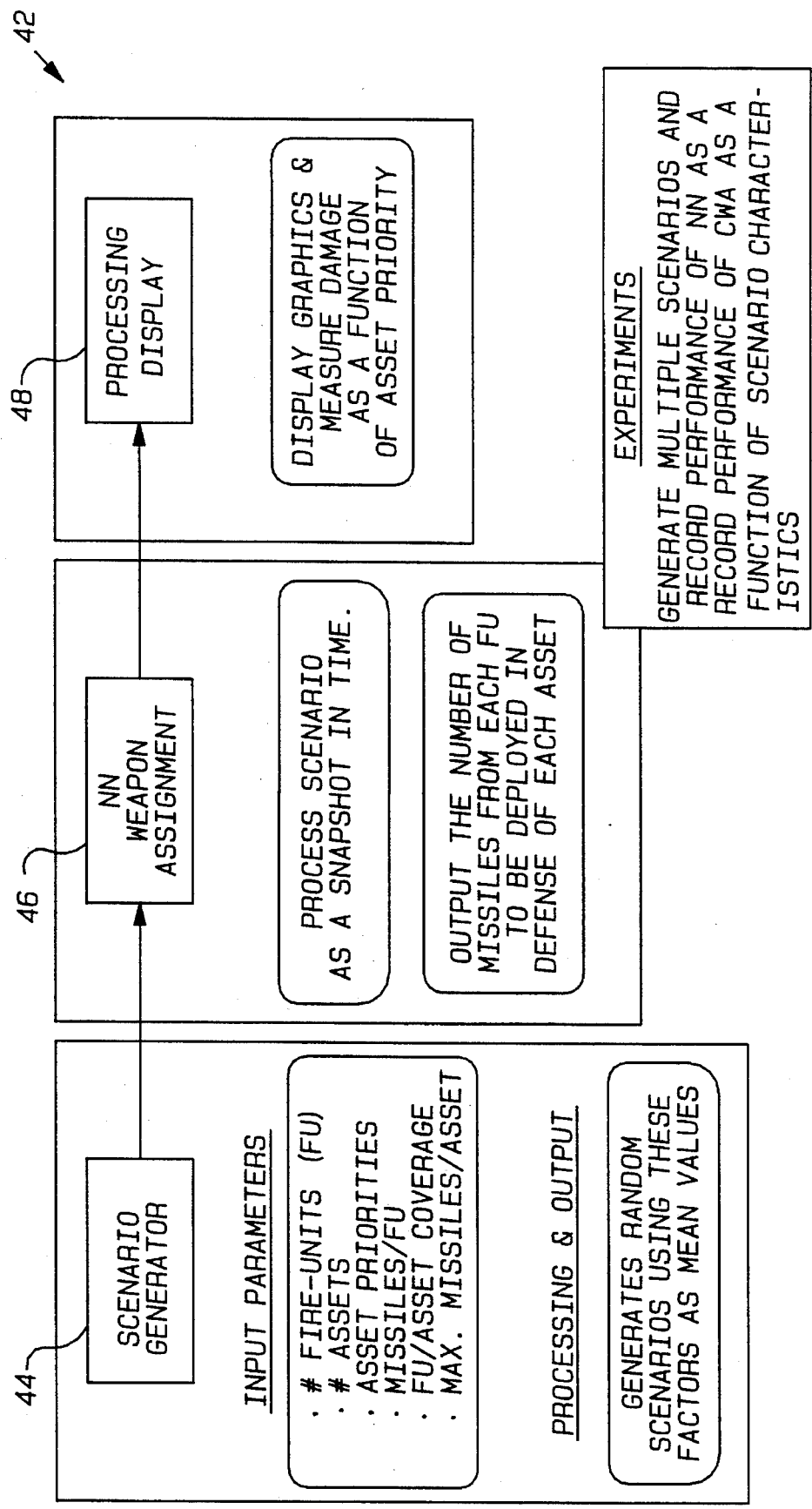
FIG 4 is a flow chart of an experimental simulation in accordance with the present invention.

Referring now to FIG. 4, there is shown a diagram of an experimental simulation 42 of the CWA system 20. The simulation has three main components: the scenario generation 44, weapon assignment 46, and processing display 48. It will be appreciated that the experimental simulation 42 may be entirely simulated in software to avoid the necessity of constructing hardware for such experiments. In the first step, scenario generation 44, the simulation 42 creates a simulated weapons assignment problem such as the one shown in FIG. 1, using input parameters such as the number of fire units, the number of assets, the asset priorities, the missiles per fire unit, the fire unit asset coverage, and the maximum missiles per asset. The scenario generator 44 will then generate random scenarios using these factors as mean values.

In the next step, weapons assignment 46, the scenario is processed as a snapshot in time. For each scenario, the number of missiles from each fire unit deployed in defense of each asset is outputted. Next, the processing display step 48 will display graphics and measure damage as a function of asset priority. A set of typical results for the experimental simulation 42 is shown in FIG. 5. In this example, the number of fire units was 3 and the average of missiles per fire unit was 60. In the first scenario, there were 11 assets and the fire unit coverage was 0.3. The number of threats was 154 and the total damage was 0.19 after one run. These results 15 also show damage broken down into high, medium and low damage measures which indicate the amount of damage incurred by high, medium, and low priority assets, respectively.

A hardware embodiment of the CWA 20 would include 20 processing elements 22, and 24 which could be constructed from simple digital logic components or microcontrollers. The variable strength interconnections 26 could consist of conventional conductors which include variable resistance devices which may be controlled by the processors 22 or 24. The logic to perform the processing flow 28, as shown in FIG. 2B, can be constructed with conventional hardware components (such as programmable microcomputers and/or logic arrays), software, or a combination of the two. It will be appreciated that due to the massively parallel, fine-grained hardware structure, very high speeds can be achieved with the hardware embodiment, that will not be achieved using a completely software simulation.

In accordance with the foregoing description, it can be seen that the CWA system 20 is able to solve large constrained assignment problems in real time. The system requires minimal algorithm development, minimal software development, and minimal preprocessing. Further, the system is tolerant of coarsely normalized input data and is able to adapt quickly to small changes in the assignment problem structure. Finally, the system can be constructed at low cost utilizing low complexity hardware components. While the above description constitutes the preferred embodiments of the present invention, it will be appreciated that the invention is susceptible to modifications, variation, and change without departing from the proper scope and fair meaning of the accompanying claims.

What is claimed is:

1. A system for assigning a plurality of fire units to defend a plurality of assets from a plurality of threats to said assets, each of said assets having a relative value and being located in a defined geographic area, each of said fire units having an initial number of weapons and each fire unit having a coverage area wherein said weapons are effective in protecting said assets, said system comprising:

a plurality of first processing elements representing said plurality of assets;

a plurality of second processing elements representing said plurality of fire units;

a plurality of interconnections connecting each of said plurality of first processing elements with each of said plurality of second processing elements, each of said interconnections having a strength that is a function of a random noise factor, the number of weapons in a particular fire unit represented by a particular second processing element, a Boolean 1 or 0 depending on whether a particular asset is inside or outside of a coverage area for the particular fire unit, respectively, represented by a particular first processing element;

means for adjusting the strength of said interconnections as a function of the relative value of the particular asset represented by the particular first processing element to which said interconnection is made;

means for determining a particular interconnection having a greatest strength;

means for assigning a weapon from said particular fire unit represented by said particular second processing unit connected by said particular interconnection having the greatest strength to defend said particular asset connected by said particular interconnection having the greatest strength; and means for determining if the greatest strength of the particular interconnection is less than the number of said fire units times the number of said assets after a weapon from said particular fire unit is assigned to defend said particular asset; and means for resetting the interconnection strength of each interconnection when the greatest strength of the particular interconnection is less than the number of said fire units times the number of said assets.

2. The system recited in claim 1 further comprising means for adjusting the strength of all interconnections to the particular second processing element representing the particular fire unit to zero when all the weapons associated with said particular fire unit are used.

3. A computer implemented method for assigning a plurality of fire units to defend a plurality of assets from a plurality of threats to said assets, each of said assets having a relative value and being located in a defined geographic area, each of said fire units having an initial number of weapons and each fire unit having a coverage area wherein said weapons are effective in protecting said assets, said method comprising:

representing said plurality of assets by a plurality of first processing elements;

representing said plurality of fire units by a plurality of second processing elements;

connecting each of said plurality of first processing elements with each of said plurality of second processing elements by interconnections, said interconnections having a strength that is a function of a random noise factor, the number of weapons in a particular fire unit represented by a particular second processing element, a Boolean 1 or 0 depending on whether a particular asset is inside or outside of a coverage area for the particular fire unit, respectively, represented by a particular first processing element;

adjusting the strength of said interconnections as a function of the relative value of the particular asset represented by the particular first processing element to which said interconnection is made;

determining a particular interconnection having a greatest strength;

assigning a weapon from said particular fire unit represented by said particular second processing element connected by said particular interconnection having the greatest strength to defend said particular asset connected by said particular interconnection having the greatest strength; and determining if the greatest strength of the particular interconnection is less than a predetermined threshold after a weapon from said particular fire unit is assigned to defend said particular asset; and resetting the interconnection strength of each interconnection when the greatest strength of the particular interconnection is less than the predetermined threshold, wherein the resetting due to the random noise factor allows other fire units a chance to participate prior to assigning all the weapons from said particular fire unit.

4. The method recited in claim 3 further comprising adjusting the strength of all interconnections to the particular second processing element representing the particular fire unit to zero when all the weapons associated with said particular fire unit are used.

5. The method recited in claim 4 further comprising the steps of:

determining an interconnection having a next greatest strength; and assigning a weapon from said particular fire unit represented by said particular second processing element connected by said particular interconnection having the next greatest strength to defend said particular asset connected by said particular interconnection having the next greatest strength; and repeating said steps of determining the next greatest strength and assigning a weapon.

6. A weapons system for defending a plurality of assets from a plurality of threats, said weapons system comprising:

a plurality of first processing elements representing the plurality of assets, each of said assets having a relative value and located in a defined geographic area;

a plurality of second processing elements representing a plurality of fire units, each of said fire units having an initial number of weapons and a coverage area where said weapons are effective in protecting said assets from the plurality of threats;

a plurality of interconnections connecting each of said plurality of first processing elements with each of said plurality of second processing elements, each of said interconnections having a strength that is a function of a random noise factor, the number of weapons in a fire unit, and a Boolean 1 or 0 depending on whether an asset is inside or outside of a coverage area;

scaling means for adjusting the strength of each interconnection based on the relative values of the assets;

selection means for determining a first maximum interconnection having a greatest strength;

assignment means for assigning a weapon from the fire unit connected by the first maximum interconnection to defend the asset connected by the first maximum interconnection; and threshold means for determining if the strength of the first maximum interconnection is less than a predetermined threshold after a weapon from the fire unit connected by the first maximum interconnection is assigned to defend the asset connected by the first maximum interconnection; and resetting means for resetting the interconnection strength of each interconnection when the strength of the first maximum interconnection is less than the predetermined threshold.

7. The weapons system recited in claim 6 wherein the coverage areas of the fire units overlap to protect the assets.

8. The weapons system recited in claim 6 further comprising probability means for determining a probability that a weapon from a fire unit will defeat the threat to an asset.

9. The weapons system recited in claim 6 further comprising adjustment means for adjusting the strength of all interconnections connected to a fire unit to zero when all the initial number of weapons associated with the fire unit are used and for adjusting the strength of all interconnections to an asset to zero when all threats associated with the asset are defeated.

10. The weapons system recited in claim 6 wherein the selection means further determines a second maximum interconnection having a next greatest strength.

11. The weapons system recited in claim 10 wherein the assignment means assigns a weapon from the fire unit connected by the second maximum interconnection to defend the asset connected by the second maximum interconnection.

12. The weapons system recited in claim 6 wherein the relative value of each asset is determined from an economic value of each asset.

13. The weapons system recited in claim 6 wherein the random noise factor is a uniform pseudo-random number which is a continuously variable value between 0 and 1.

14. The weapons system recited in claim 6 wherein said predetermined threshold is equal to the number of fire units times the number of assets.

15. The weapons system recited in claim 6 wherein said resetting means due to the random noise factor allows other fire units to participate prior to assigning all the weapons from the fire unit connected by the first maximum interconnection.

* * * * *